United States Patent [19]

Allaire

[11] Patent Number: 4,739,698

[45] Date of Patent: Apr. 26, 1988

[54] APPARATUS AND METHOD FOR COOKING WITH STEAM

[76] Inventor: Pascal M. Allaire, 217 Tower Dr., #12, Beverly Hills, Calif. 90211

[21] Appl. No.: 38,001

[22] Filed: Apr. 14, 1987

[51] Int. Cl.$^4$ .............................................. A47J 27/04
[52] U.S. Cl. ...................................... 99/410; 99/417; 126/369
[58] Field of Search ................................... 99/410–418, 99/421 R, 445, 450; 126/369, 369.1, 369.2, 369.3, 377, 378, 381, 382, 383, 385

[56] References Cited

U.S. PATENT DOCUMENTS

| | | | |
|---|---|---|---|
| 73,630 | 1/1868 | Moore | 126/369 X |
| 76,231 | 3/1868 | Morandi | 126/369 |
| 78,587 | 6/1868 | Fuller | 126/369 |
| 170,921 | 12/1875 | Viehmeyer | 126/369 |
| 177,828 | 5/1876 | Guernsey | 126/369.2 |
| 1,341,960 | 6/1920 | Meyer et al. | 99/416 X |
| 1,461,092 | 7/1923 | Ivancic | 126/369.1 |
| 2,186,855 | 1/1940 | Baccarini | 99/417 |
| 2,556,115 | 6/1951 | Smith | 99/417 |
| 4,462,308 | 7/1984 | Wang | 99/413 |

OTHER PUBLICATIONS

"Approuvés par le Corps Medical, un Chef-Cuisinier Marseillais Déclarent la Querre au Barbecue et à la Cocotte-Minute," News Article Advertisement for Recipe Book, La Vie à Pleines Dents, (1982).

Primary Examiner—John M. Jillions
Attorney, Agent, or Firm—Knobbe, Martens, Olson & Bear

[57] ABSTRACT

An apparatus for steaming food is disclosed. Food suspended within a compartment of the apparatus is cooked by steam rising from a reservoir of boiling water below. After passing through the food compartment, steam collects in a dome shaped lid where it condenses to water then which flows by means of a gutter device below the lid into channels along the food compartment walls to return to the reservoir without contacting the food.

9 Claims, 1 Drawing Sheet

U.S. Patent  Apr. 26, 1988  4,739,698
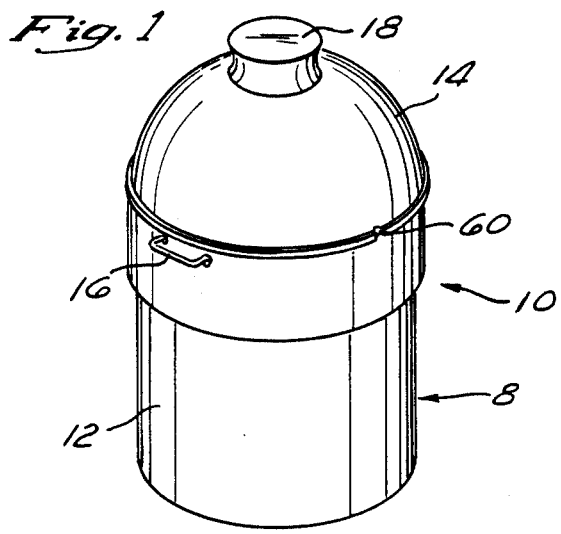
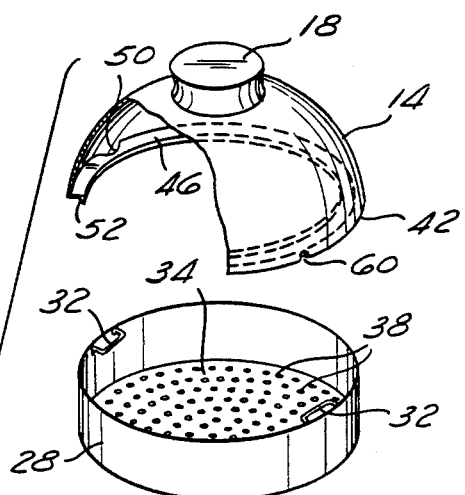
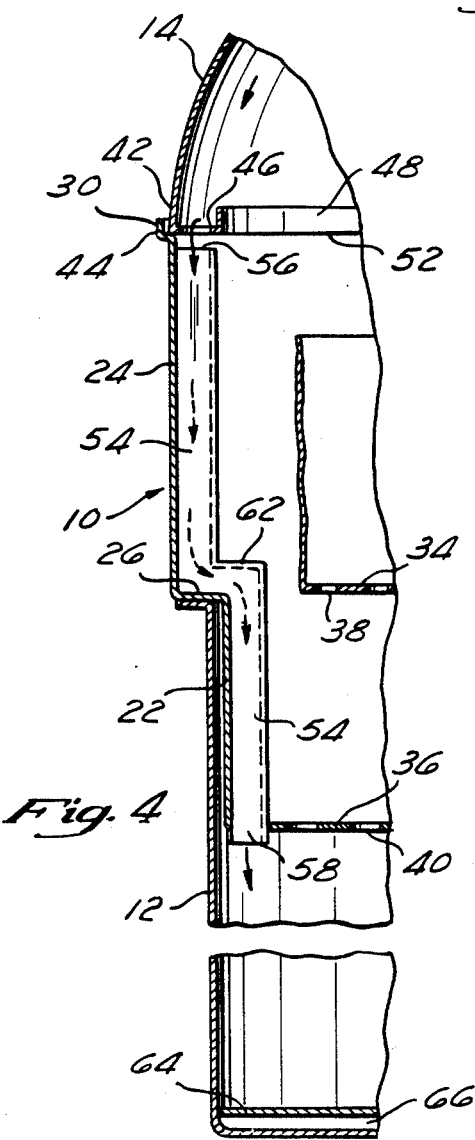
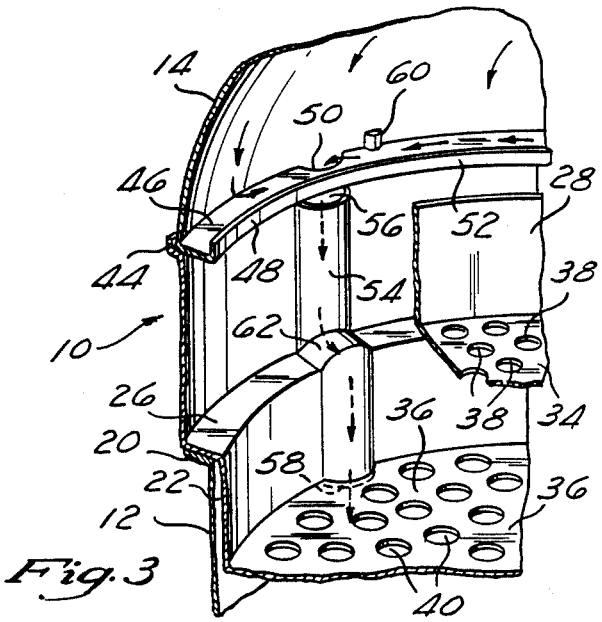

APPARATUS AND METHOD FOR COOKING WITH STEAM

BACKGROUND OF THE INVENTION

This invention relates to an apparatus to cook food with steam. The benefits of cooking with steam as opposed to alternative methods are appreciated by many concerned with the nutritive value as well as the aesthetic qualities of food.

Raw foodstuffs such as meats and vegetables are made up of cells which have a high water content. When such foods are cooked under dry conditions, as when baked, they lose intrinsic moisture and may become less palatable and less attractive. When food is cooked by immersion in boiling water, the water in the food cells will expand and also boil, breaking down cell membranes and walls. The result is not only a deterioration in texture but also a loss of flavor and color as soluble cell contents are diluted away.

Even at room temperature, the quality of food is affected when it is immersed in water. Osmotic effects will cause cells to expand and rupture in hypotonic environments and to shrink in those that are hypertonic. Equilibrium forces cause a redistribution of ions and small molecules between intercellular and extracellular compartments which can be detrimental to flavor and nutritive value. These effects proceed more rapidly as the temperature is increased.

An ideal device then should cook food in a moist atmosphere, below the boiling point of water, and without allowing it to become saturated with water.

Existing cooking devices, such as the double boiler, the pressure cooker and variants of vessels containing racks to suspend food over boiling water do not achieve all of these objectives.

A double boiler consists of a pot for holding food which is nested into another containing boiling water. The food is out of contact with water and the temperature in the upper pot cannot exceed the steam temperature, however, since the steam does not penetrate the food but only contacts the exterior of the cooking pot, the method is only suitable for heating liquids, which can conduct and distribute the heat. Food cooked on a rack in a pressure cooker is penetrated by steam and suspended above the water level; however, the purpose of this method is to reduce cooking times, a purpose achieved by increasing the pressure so that the temperature can be raised above the atmospheric boiling point of water. Such temperatures, even in the absence of boiling, can adversely affect food textures. The simple process of cooking food over boiling water on a rack in a covered vessel comes close to the ideal method, but in practice, steam condenses on the inside of the vessel lid and drips back into the food. Since condensate is cooler than the steam, it interrupts the cooking process in local regions where it falls and the cooked food lacks uniform texture. Further, soluble constituents of the food are leached away as condensate percolates down through. The double boiler and pressure cooker devices suffer these drawbacks as well.

The present invention makes it possible to cook food uniformly and at a constant temperature below the boiling point of water by means of steam, at ambient pressure. It avoids the contact of condensate with food by providing a means to divert it from the compartment in which food is cooked and return it to a reservoir.

SUMMARY OF THE INVENTION

In accordance with one aspect of the present invention there is provided an apparatus for cooking food with steam comprising a reservoir for containing water which is heated to generate steam, a container above the water for holding food, having a side and also a bottom which is perforated so that steam can cook the food in the container, a lid on the container to condense steam, a means for collecting the condensed staem, and a channel in the side of the container for channeling collected condensed steam past the food and into the reservoir.

In one preferred embodiment the apparatus comprises a base compartment having a bottom and substantially vertical sides to contain water, a food compartment supported by the base compartment having a bottom which is perforated, a lower section inside the base compartment, essentially vertical side walls, a top and an upper section outside of the base compartment and above the base compartment, a lid on the top of the food compartment to collect and condense water vapor above the food compartment, at least one enclosed channel in the side wall of the food compartment having a first open end at the upper edge of the food compartment and a second open end below the perforated bottom, a gutter near the top of the food compartment to collect condensed water vapor from the lid and divert it into the first open end of the enclosed channel, the gutter and the channel acting to transfer condensed water vapor from the lid to the base compartment thereby avoiding contact of water with the food. Optimally in this embodiment the bottom of the base compartment comprises two layers of material spaced apart from each other and a lid that is dome shaped.

In another preferred embodiment of the invention, the food compartment may contain within the upper section a tray having a perforated bottom. Optimally in this embodiment the perforations in the tray will be smaller than the perforations in the bottom of the food compartment.

In still another preferred embodiment of the invention, the gutter may be a flat strip lying below the lid having an aperture, having an outer edge in contact with the periphery of the lid and inner edge bearing a vertical lip, having a width at least the diameter of the vertical channel of the food compartment below, and sloping downwardly from inner edge to outer edge. Optimally the gutter may be affixed to the lid and there may be provided a mechanical index to align the aperture of the gutter with the channel below.

In another embodiment of the invention the base compartment and the food compartment are essentially cylindrical in shape.

In accordance with another aspect of the present invention there is provided an improvement in an apparatus for cooking food in steam by suspending food above boiling water, the improvement comprising a means for condensing steam above the food, a means for collection the condensed steam, and a channel for carrying the collected condensed steam down past the food while avoiding contact between the food and the condensed steam.

In accordance with yet another aspect of the present invention there is provided a method of cooking food with steam, comprising placing food in a container heaving perforations therethrough, allowing steam from a heated reservoir below the food to pass through the food, trapping the steam above the food and condensing it to water, and transferring the water to the reservoir by way of a channel formed in the side of the container so that the water does not contact the food.

BRIEF DESCRIPTION OF THE DRAWINGS

The accompanying drawings show an apparatus for cooking food with steam in accordance with one preferred embodiment of the present invention.

FIG. 1 is a side elevational view of the assembled apparatus.

FIG. 2 is an exploded perspective view of the apparatus, showing the individual components aligned in the order of their assembly, and with walls cut away to reveal internal features.

FIG. 3 is a fragmentary enlarged vertical section of the central part of the assembled apparatus.

FIG. 4 is a fragmentary enlarged vertical section of the side wall and bottom of the assembled apparatus.

DETAILED DESCRIPTION OF THE INVENTION

FIG. 1 and FIG. 2 show a preferred embodiment of the invention, which is a cooking apparatus 8 comprising two cylindrically shaped compartments with substantially vertical sides, an upper food compartment 10 nested into a water reservoir 12 below. The food compartment 10 is covered by a dome-shaped lid 14, and has handles 16 permanently attached to the side walls to facilitate its handling. The lid also has a handle 18 preferably mounted at its apex.

FIG. 2 shows the detailed construction of each of the components of this embodiment. The reservoir 12 has a lip 20 at its upper edge which supports the food compartment 10 when the apparatus is assembled. The food compartment 10 comprises a lower section 22 and an upper section 24. The lower section 22 of the food compartment is smaller in diameter than the reservoir 12 and the upper section 24 is larger in diameter than the reservoir 12. The lower section 22 is deep enough to nest securely in the reservoir 12 and is less deep than the upper section 24; however, in various embodiments it may be of equal or greater depth. It is also possible to eliminate the lower section and still retain the features of the invention. The two sections of the food compartment 10 meet at a shoulder 26 which in this embodiment serves as a support for an optional tray 28. The shoulder 26 also serves to support the food compartment 10 above the reservoir 12. Alternatively, the tray could be suspended from a rim 30 (which is provided at the top of the food compartment 10) by projecting tabs or similar devices (not shown). The tray 28 may also be of cylindrcal shape and has a diameter intermediate between those of the upper 24 and lower 22 sections of the food compartment 10. Handles 32 are fixed to the interior walls of the tray 28 to facilitate its insertion and removal. A food compartment bottom 34 and a tray bottom 36 are provided, respectively, in the food compartment 10 and the tray 28. Both bottoms 34, 36 are perforated to allow steam to pass through from below. The tray bottom perforations 38 are preferably smaller than the food compartment bottom perforations 40. In one of the preferred embodiments, the perforations 38 of the food compartment bottom 32 are 3/16 inch in diameter spaced ⅛ inch apart and the perforations of the tray bottom 34 are ⅛ inch in diameter spaced 3/16 apart. In addition to perforated metal, mesh or similar material having holes therethrough may be used for the tray bottom 34 and the food compartment bottom 32.

The domed lid 14 has a diameter at its lower periphery 42 corresponding to that of the food compartment 10 and seats on an L-shaped lip 44 of its rim 30. Other mating conformations of lid periphery 42 and rim 30 are acceptable which allow a seal that substantially retains the water vapor within without increasing internal pressure. Also, at the lower periphery of the lid 42 a ledge 46 extends inward and centrally for a short distance to terminate in a vertical lip 48 as seen in FIG. 3 and FIG. 4. At least one aperture 50 along its length allows the ledge 46 to act a a gutter 52, collecting condensed moisture running down the interior surface of the lid and diverting it into at least one channel 54 running downward along the wall of the food compartment 10 below. The width of the gutter 52 may be approximately equal to the width of a first open end 56 of the channel 54 and the dimensions of its apertures are preferably less than the cross-sectional dimensions of the channels so that water does not flow down outside the channels. When the entire cooking apparatus 8 is on a level surface, the gutter 52 preferably slopes along its length down toward the aperture or apertures 50 to direct condensed water vapor into the channels 54. The gutter 52 may either be integral with the lid as shown in this embodiment or it may be a separate component to be placed between the lid 14 and the food compartment 10. In either case an externally placed mechanical index 60 such as a detent may be used to align gutter apertures 50 with intake openings 56 of channels 54 below. Alternatively, the gutter may be integral with the side wall of the food compartment, and no aligning device would be required.

FIG. 3 and FIG. 4 show one of the enclosed channels 54 of the food compartment 10 which carry condensed water vapor from the gutter 52 above past the food in the compartment 10 and into the reservoir 12 at the bottom. Channels may be formed by attaching rounded strips of materials to the interior walls of the food compartment 10 by welding or other means of permanent bonding so as to seal the lateral edges. The channels 54 are essentially vertical in orientation having an open intake end 56 jsut below the rim 30 and an open discharge end 58 below the perforated bottom panel 32, and in this embodiment have a right angled dogleg 62 at the shoulder where the upper 24 and lower 22 sections meet.

The reservoir 12 in this embodiment has a two-layered bottom panel 64 in which a gap 66 of approximately ¼ inch separates the layers. The channels 54 are bounded by the curved wall of the food compartment 10 and the rounded strips and are essentially elliptical in horizontal cross-section.

In operation this apparatus allows steam generated from boiling water in the reservoir to pass through the food compartment 10 through perforations 36, 38 in the bottom panels of the compartment 10 and auxiliary tray 28, raising the temperature of the food contained therein and cooking it. After passing through the food compartment, steam is trapped in the dome-shaped lid 14 and condenses to water on its inner surface. FIG. 3 and FIG. 4 show the route of the condensed water vapor from the inner surface of the lid 14 back to the reservoir 12. The water flows down to be collected in the gutter 52. The slope of the gutter 52 assists in diverting the flow through apertures 50 lying above the open ends 56 of channels 54 in the walls of the food compartment below. By means of these channels 54 steam, condensed to water after passing through the food compartment 10, is returned to the reservoir 12 without coming into contact with the food.

What is claimed is:

1. An apparatus for cooking food with steam, comprising:
    a base compartment having a bottom and substantially vertical sides to contain water;
    a food compartment supported by said base compartment having a bottom which is perforated, a lower section inside said base compartment, substantially vertical sidewalls, a top, and an upper section outside of said base compartment and above said base compartment;
    a lid on the top of said food compartment to trap and condense water vapor above said food compartment;
    at least one enclosed channel in said side wall of said food compartment having a first open end at the top of the upper section of said food compartment and second open end at the bottom of said lower section;
    a gutter near the top of said food compartment to collect condensed water vapor from said lid and divert it into said first open end of said channel, said channel and said gutter acting together to transfer condensed water vapor from said lid to said base compartment, thereby avoiding contact of said condensed water vapor with food, wherein said gutter is affixed to said lid.

2. An apparatus for cooking food with steam, comprising:
    a base compartment having a bottom and substantially vertical sides to contain water;
    a food compartment supported by said base compartment having a bottom which is perforated, a lower section inside said base compartment, substantially vertical sidewalls, a top, and an upper section outside of said base compartment and above said base compartment;
    a lid on the top of said food compartment to trap and condense water vapor above said food compartment;
    at least one enclosed channel in said side wall of said food compartment having a first open end at the top of the upper section of said food compartment and a second open end at the bottom of said lower section;
    a gutter near the top of said food compartment to collect condensed water vapor from said lid and divert it into said first open end of said channel, said channel and said gutter acting together to transfer condensed water vapor from said lid to said base compartment, thereby avoiding contact of said condensed water vapor with food, wherein said gutter is a substantially horizontal strip lying beneath said lid having at least one aperture therethrough, having an outer edge in contact with the periphery of the lid, and an inner edge bearing a vertical lip.

3. An apparatus according to claim 2, further comprising a tray having a perforated bottom, said tray being seated within said upper section of said food compartment.

4. An apparatus according to claims 2 or 3, wherein said base compartment and said food compartment are substantially cylindrical in shape.

5. An apparatus according to claims 2 or 3, wherein the bottom of said base compartment comprises two layers of material spaced apart from each other.

6. An apparatus according to claim 3, wherein the perforations in said bottom of said tray are smaller than the perforations in said bottom of said food compartment.

7. An apparatus according to claim 2 or 3, wherein said gutter is affixed to said lid.

8. An apparatus according to claim 2 or 3, wherein said lid is dome-shaped.

9. An apparatus according to claim 2 or 3, further comprising a mechanical index to facilitate alignment of said aperture in said gutter with said channel.

* * * * *